United States Patent
Lin et al.

(10) Patent No.: US 9,109,579 B2
(45) Date of Patent: Aug. 18, 2015

(54) WINDMILL AND HUB SEALING APPARATUS THEREOF

(75) Inventors: Jung-Kuei Lin, Hsinchu (TW); Yun-Yuan Chang, Taipei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 422 days.

(21) Appl. No.: 13/563,479

(22) Filed: Jul. 31, 2012

(65) Prior Publication Data

US 2013/0136604 A1  May 30, 2013

(30) Foreign Application Priority Data

Nov. 25, 2011 (TW) .............. 100143430 A

(51) Int. Cl.
*F03D 1/06* (2006.01)
*F03D 11/00* (2006.01)
*F16C 33/76* (2006.01)
*F16C 33/78* (2006.01)

(52) U.S. Cl.
CPC .............. *F03D 1/0658* (2013.01); *F03D 11/00* (2013.01); *F16C 33/768* (2013.01); *F16C 33/7836* (2013.01); *F16C 33/7886* (2013.01); *F16C 33/7896* (2013.01); *F05B 2240/221* (2013.01); *F05B 2240/57* (2013.01); *F16C 2300/14* (2013.01); *F16C 2360/31* (2013.01); *Y02E 10/721* (2013.01); *Y02E 10/722* (2013.01); *Y10T 29/49316* (2015.01)

(58) Field of Classification Search
CPC ... F03D 1/0658; F03D 11/00; F16C 33/7896; F16C 33/7836; F16C 33/768; F16C 33/7886; F16C 2300/14; F16C 2360/31; Y10T 29/49316; Y02E 10/721; Y02E 10/722; F05B 2240/57; F05B 2240/221
USPC .......... 416/146 A, 204 R, 239, 248; 277/500, 277/548, 549, 585
See application file for complete search history.

(56) References Cited

U.S. PATENT DOCUMENTS

| | | | | |
|---|---|---|---|---|
| 1,169,583 | A | * | 1/1916 | Van Dervort .................. 277/548 |
| 5,605,337 | A | * | 2/1997 | Puri .............................. 277/349 |
| 5,820,132 | A | * | 10/1998 | Marnot ......................... 277/551 |
| 5,954,477 | A | | 9/1999 | Balsdon |
| 2009/0175724 | A1 | * | 7/2009 | Russ et al. .................... 416/131 |

(Continued)

FOREIGN PATENT DOCUMENTS

| CN | 201588744 U | 9/2010 |
|---|---|---|
| CN | 201714586 U | 1/2011 |

(Continued)

OTHER PUBLICATIONS

Watanabe, Rootor blade bearing seal device for windmill generator, Mar. 26, 1996 JP 08-082322A abstract.*

(Continued)

*Primary Examiner* — Liam McDowell
(74) *Attorney, Agent, or Firm* — Rabin & Berdo, P.C.

(57) ABSTRACT

A windmill having a hub sealing apparatus for sealing an interface between a hub and a blade of the windmill, The hub sealing apparatus includes a bottom sealing ring configured to be sealed to the hub, a top sealing ring configured to be rotatably sealed to the blade, and a middle sealing ring configured to be sealed to the top sealing ring and the bottom sealing ring, so as to connect the top and bottom sealing rings.

49 Claims, 6 Drawing Sheets

(56) References Cited

U.S. PATENT DOCUMENTS

| | | | |
|---|---|---|---|
| 2009/0186740 A1 | 7/2009 | Saenz De Ugarte et al. | |
| 2011/0074758 A1 | 3/2011 | Wacyk et al. | |
| 2011/0138963 A1 | 6/2011 | Pischel | |
| 2011/0182735 A1 | 7/2011 | Kodama | |
| 2011/0243741 A1* | 10/2011 | Eriksen et al. | 416/174 |
| 2014/0186153 A1* | 7/2014 | Baun et al. | 415/1 |

FOREIGN PATENT DOCUMENTS

| | | | |
|---|---|---|---|
| DE | 102009035248 A1 | | 2/2011 |
| EP | 2096303 A1 | | 9/2009 |
| EP | 2375092 A1 | | 10/2011 |
| JP | 08-082322 A | * | 3/1996 |
| JP | 2008542650 A | | 11/2008 |
| JP | 2009052681 A | | 3/2009 |
| JP | 2011064224 A | | 3/2011 |
| TW | M33958 | | 9/2008 |
| TW | 200908516 A | | 2/2009 |
| TW | 200920937 A | | 5/2009 |
| TW | 201005180 A | | 2/2010 |
| TW | M374507 | | 2/2010 |
| TW | 201014970 A | | 4/2010 |
| TW | M381684 U | | 6/2010 |
| TW | 201126063 A | | 8/2011 |
| WO | WO-2007061439 A2 | | 5/2007 |
| WO | WO-2011012664 A2 | | 2/2011 |
| WO | WO-2011012683 A2 | | 2/2011 |

OTHER PUBLICATIONS

Watanabe, Rootor blade bearing seal device for windmill generator, Mar. 26, 1996 JP 08-082322A machine translation.*

Taiwanese Patent Office, Notice of Allowance issued on May 16, 2014.

European Patent Office, Office Action issued on Feb. 20, 2014.

Herbert et al., Performance, reliability and failure analysis of wind farm in a developing country, Renewable Energy, 2010, pp. 2739-2751.

KG, New material extends life of offshore wind-turbine seals, Sealing Technology, Apr. 2010, p. 2.

The Timken Co., Timken unveils Ultra Wind P1 seal for wind-turbine applications, Sealing Technology, Jun. 2011, p. 16.

Corten et al., Wind-turbine bearing seal, Sealing Technology, Jan. 2010, p. 12.

Flitney, Wind power presents sealing challenges, Sealing Technology, Feb. 2009, pp. 7-10.

* cited by examiner

WINDMILL AND HUB SEALING APPARATUS THEREOF

CROSS-REFERENCE TO RELATED APPLICATION

The present application claims priority from Taiwan Patent Application No. 100143430 filed in the Taiwan Patent Office on Nov. 25, 2011, the entire content of which is incorporated herein by reference.

TECHNICAL FIELD

The present invention relates to a windmill and a hub sealing apparatus for windmills, and more particularly, to a sealing apparatus and a windmill with the sealing apparatus.

BACKGROUND

With increasing attention toward global environmental consciousness, especially in energy saving and carbon reduction, green energy (such as solar power, wind power, wave power, hydrogen energy or biomass energy) is becoming a focal point for industries all over the world, since it can be extracted, generated, and/or consumed without any significant negative impact to the environment. Among the variety of forms of green energy, wind power is the one most likely to become a major alternative energy source in the near future.

The harvesting of wind power is enabled through the use of windmills. Generally, a windmill is composed of: a tower, arranged at a specific location conforming to certain conditions; a gear box, mounted to an end of the tower; a generator, mounted at the end of the tower alongside the gear box to allow the same to be driven by the gear box so as to generate electricity; and a blade module, coupled to the gear box by a bearing for allowing the gear box to be driven by the blade module. The blade module is configured with a plurality of blades in a manner that each blade is coupled to the bearing while the bearing is further coupled to a hub. It is noted that there can be sealing components respectively arranged at a position between the blades and the bearing, and also at a position between the bearing and the hub.

Operationally, when the blades in the blade module are driven to rotate by wind power, the bearing will be brought along to rotate so as to drive the hub to rotate as well, and then the rotation of the hub is transmitted to the generator through the gear box to enable the generator to generate electricity. Simultaneously, the rotation of the plural blades can be adjusted and controlled by the use of a pitch motor for achieving maximum wind power harvesting, as the pitch motor is connected to an internal ring gear embedded in the bearing through the coupling of a small gear. However, if there is no sealing means arranged at the interface (or interval) between the inner ring of the bearing and the blades, and between the outer ring of the bearing and the hub, for preventing water or foreign objects from entering into the hub through those interfaces, the electric control equipment arranged inside the hub might be in danger of being damaged and thus beginning to malfunction. Consequently, the hub is usually sealed by a kind of sealing apparatus to be used for preventing water from entering and also for preventing leakage of internal lubricating oil. Ideally, the hub can be sealed satisfactorily by a conventional sealing apparatus. In reality, however, the sealing effect of the conventional seal apparatus can easily be devastated by material failure, inferior working conditions or a harsh environment.

Existing windmills with a water-proof seal design are inflexible because the conventional sealing apparatus cannot easily be detached or replaced. Nor can such conventional apparatus be adapted to many windmills available on the market today.

SUMMARY

The present disclosure describes a windmill, and a hub sealing apparatus for windmills, which is includes an assembly of a multiple sealing rings or sealing ring parts that can be detached and replaced easily, and is designed with a flexible architecture for allowing the sealing apparatus to be adapted to any type of windmill and thus to achieve a better sealing effect.

Such a hub sealing apparatus may include a bottom sealing ring, mounted to an end of a hub; a middle sealing ring, coupled the bottom sealing ring while being arranged at a position neighboring to a bearing outer ring; and a top sealing ring, coupled to the middle ring while being arranged at a position neighboring to a blade; wherein the hub is coupled to the bearing outer ring, the bearing outer ring is coupled to a internal gear of a bearing inner ring, and the internal gear of the bearing ring is coupled to the blade.

In another embodiment, the a hub sealing apparatus includes a bottom sealing ring, mounted to an end of a hub; a middle sealing ring, coupled the bottom sealing ring while being arranged at a position neighboring to a bearing outer ring; and a top sealing ring, coupled to the middle ring while being arranged at a position neighboring to a blade; wherein, the middle sealing ring is composed of two or more middle ring segments that are capable of interconnecting to each other for forming a full ring; and the top sealing ring is composed of two or more top ring segments that are capable of interconnecting to each other for forming a full ring; wherein, the hub is coupled to the bearing outer ring, the bearing outer ring is coupled to an internal gear of a bearing inner ring, and the internal gear of the bearing ring is coupled to the blade.

In still another embodiment, a windmill includes a nacelle; a generating unit installed in the nacelle; a shaft installed in the nacelle and coupled to the generating unit; a hub, coupled to the shaft, having at least one bearing outer ring and at least one internal gear of a bearing inner ring, the bearing outer ring being coupled to the internal gear of the bearing inner ring; at least one blade coupled to the internal gear of the bearing inner ring; a tower coupled to the nacelle; and at least one hub sealing apparatus. Each hub sealing apparatus of this embodiment has: a bottom sealing ring mounted to an end of the hub; a middle sealing ring coupled the bottom sealing ring while being arranged at a position neighboring to the bearing outer ring; and a top sealing ring coupled to the middle ring while being arranged at a position neighboring to a blade.

Thus, the hub sealing apparatus described herein may have the following advantages:

(1) Since the hub sealing apparatus is constructed as an assembly of a plurality of sealing rings, i.e. it is of a multi-ring structure, the hub sealing apparatus can be detached from the hub more easily than can conventional sealing devices.

(2) The hub sealing apparatus is designed with a flexible architecture for allowing the sealing apparatus to be adapted to many if not all types of windmills available on the market today.

(3) By the multi-ring structure, the hub sealing apparatus disclosed herein can form multiple seals to the hub for achieving a better sealing effect.

Further scope of applicability of the present disclosure will become more apparent from the detailed description given hereinafter. However, it should be understood that the detailed description and specific examples, while indicating exemplary embodiments, are given by way of illustration only, since various changes and modifications within their spirit and scope will become apparent to those skilled in the art from this detailed description.

BRIEF DESCRIPTION OF THE DRAWINGS

The present disclosure will become more fully understandable from the detailed description given herein below and the accompanying drawings which are given by way of illustration only, and thus are not limitative of the present disclosure and wherein.

DESCRIPTION OF THE EXEMPLARY EMBODIMENTS

To further understand and recognize the functions and structural characteristics of the windmill and sealing apparatus thereof, several exemplary embodiments cooperating with a detailed description are presented as follows.

Figure 1A:
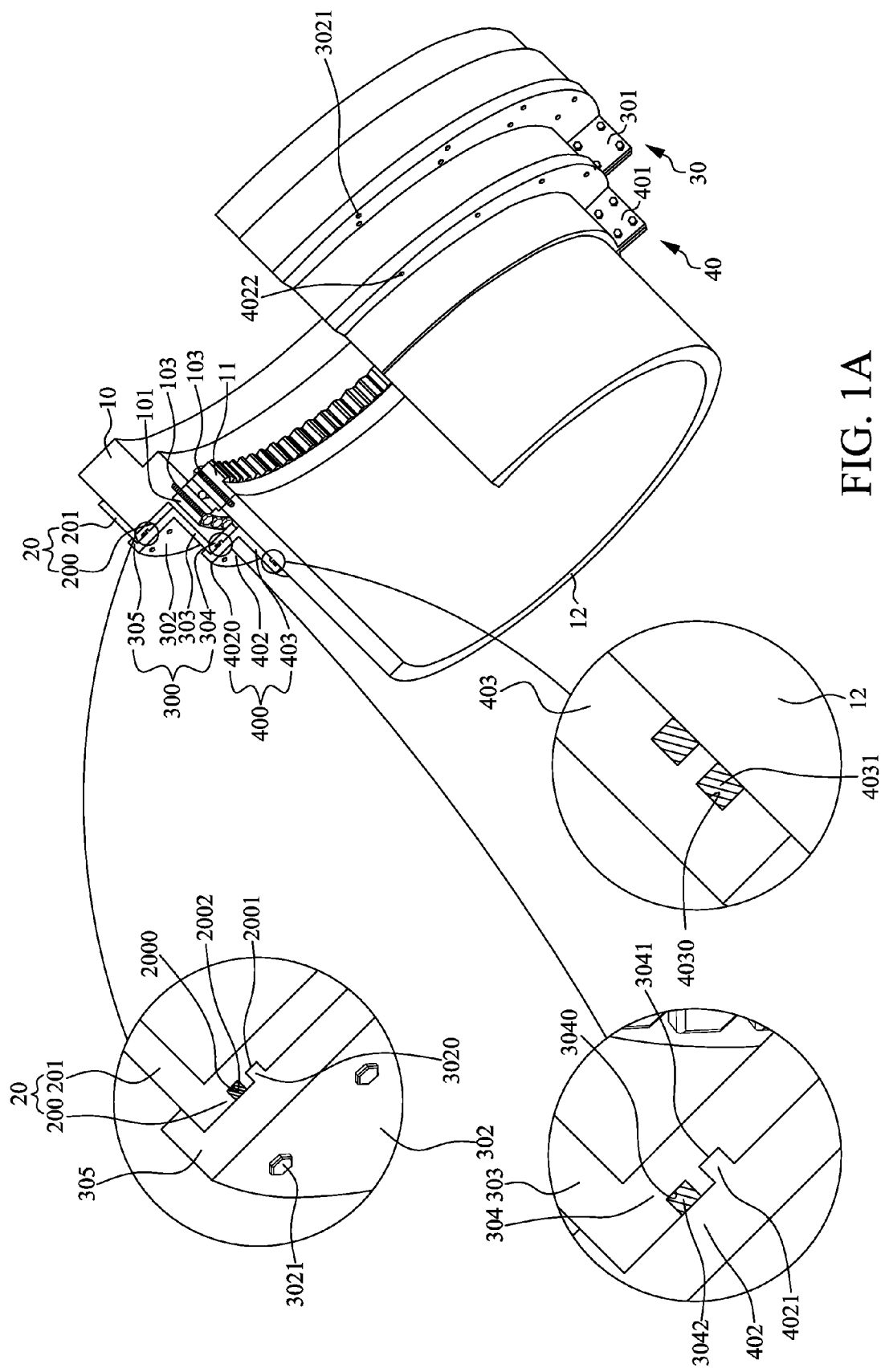
FIG. 1A is a three-dimensional diagram showing a hub sealing apparatus for windmills according to a first embodiment that is cut open to reveal its cross section and the partial enlargements of different portions of the hub sealing apparatus.
Figure 1C:
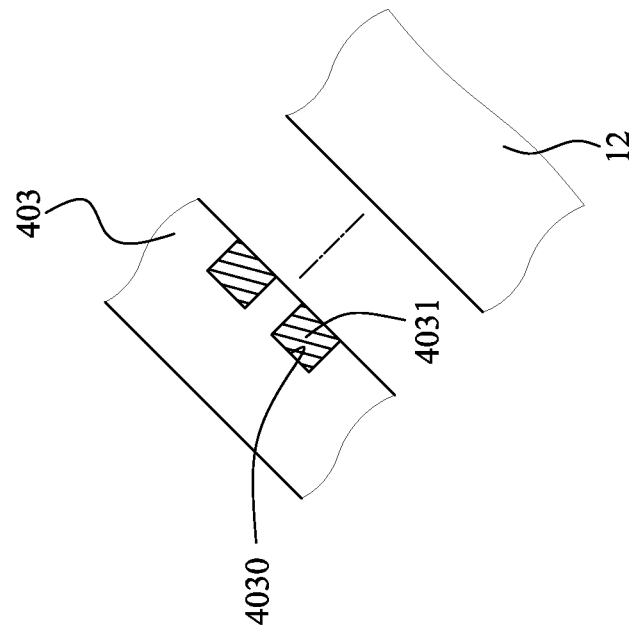
FIG. 1C is a partial schematic diagram showing a blade and the top sealing ring in an exploded view.
Figure 1B:
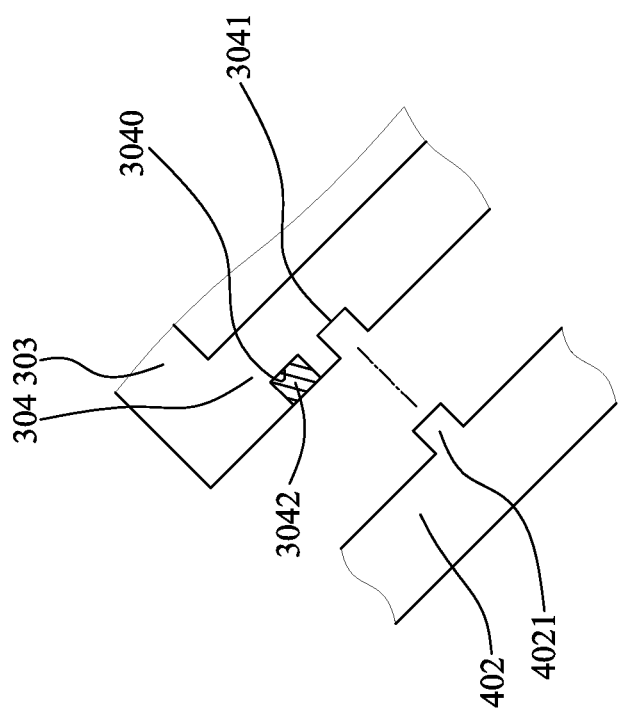
FIG. 1B is a partial schematic diagram showing a top sealing ring and a middle sealing ring in an exploded view of the first embodiment.
Figure 2:
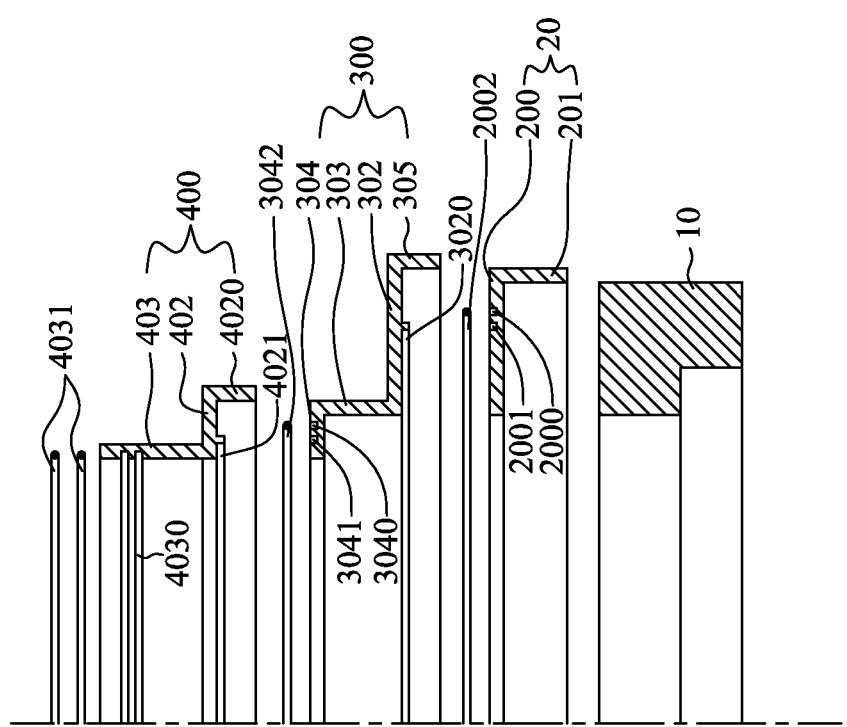
FIG. 2 is a partial schematic diagram showing different portions of the hub sealing apparatus in an exploded view of the first embodiment.

FIG. 1A a three-dimensional diagram showing a hub sealing apparatus for windmills according to a first embodiment that is cut open to reveal its cross section. FIG. 1B is a partial schematic diagram showing a top sealing ring and a middle sealing ring in exploded view of the first embodiment. FIG. 1C is a partial schematic diagram showing a blade and the top sealing ring in an exploded view. FIG. 2 is a partial schematic diagram showing the different portions of the hub sealing apparatus in an exploded view of the first embodiment. In this embodiment, the hub sealing apparatus is adapted to be mounted on a hub 10 while the hub 10 is coupled to a bearing outer ring 101, where the bearing outer ring 10 is further coupled to an internal gear 11 of a bearing inner ring (not shown), and an internal gear 11 of the bearing inner ring is coupled to a blade 12. Moreover, the bearing outer ring 11 may be securely fixed to the hub 10 by a plurality of bolts 103, and similarly the blade 12 may be securely fixed to the internal gear 11 of the bearing inner ring by such bolts 103. The hub sealing apparatus is provided to address a conventional leaking problem that generally occurs at the interface (such as an interval) between the hub 10 and the bearing outer ring 101, and also at the interface (or an interval) between the internal gear 11 of the bearing inner ring and the blade 12. In this embodiment, the hub sealing apparatus comprises a bottom sealing ring 20, a middle sealing ring 30 and a top sealing ring 40.

As shown in FIG. 2, the cross section of the bottom sealing ring 20 is formed like the letter "L", whereas the bottom sealing ring 20 is mounted and fixed to the hub 10. In addition, the bottom sealing ring 20 may be configured with a bottom support 200 and an interface 201 in a manner that the bottom support 200 is mounted to an end of the hub 10, and the interface 201 may be disposed so as to correspond to the periphery of the hub 10 while allowing the bottom support 200 to couple with the interface 201. As shown in FIG. 2, one surface of the bottom support 200 is formed with a bottom ring groove 2000, a recess, e.g. a bottom slot 2001 and a plurality of bottom fixing holes (not shown) in a manner that the bottom ring groove 2000 and the bottom slot 2001 are arranged between the bottom fixing holes while allowing the bottom ring groove 2000 to be filled by a sealant 2002. In this embodiment, the sealant 2002 is an elastic sealing part (e.g. an elastic sealing ring).

Moreover, the middle sealing ring 30 may be formed in a double-L shape in cross section, whereas the middle sealing ring 30 is mounted on the bottom support 200 while being arranged neighboring to the bearing outer ring 101. In this embodiment, the middle sealing ring 30 is composed of multiple ring segments such as two middle half rings 300 that are capable of interconnecting to each other for forming a full ring. In the case of the two middle half ring halves, the two ends of each middle half ring 300 are formed respectively with a middle lug 301 to be used for coupling to the corresponding middle lug 301 formed on the other middle half ring so as to form the complete middle sealing ring 30. Moreover, each of the two middle half rings 300 is configured with half of a middle coupler 302, half of a middle extension part 303 and half of a middle support 304.

The middle coupler 302 is arranged to couple to an end of the middle extension part 303, whereas the middle coupler 302 has a middle shoulder part 305 formed on one end thereof for abutting against the interface 201 of the bottom sealing ring 20, and thus enabling the middle sealing ring 30 to engage exactly with the bottom sealing ring 20. As shown in FIG. 2, the middle coupler 302 may be further formed with a protrusion, e.g. a middle block 3020 at a position corresponding to the bottom slot 2001 for allowing the same to be inset into the bottom slot 2001, so as to fixedly secure the middle sealing ring 30 to the bottom sealing ring 20 and to simultaneously seal the bottom slot 2001. In addition, the middle coupler 302 is formed with a plurality of middle coupling holes (not shown) at positions corresponding to the plural bottom fixing holes, so that each middle coupling hole can be fitted to the bottom fixing hole corresponding thereto by a fixing element 3021, so as to lock the middle sealing ring 30 and the bottom sealing ring 20 together.

Moreover, the middle support 304 is coupled to an end of the middle extension part 303 other than the end coupling to the middle coupler 302, whereas one surface of the middle support 304 is formed with a middle ring groove 3040, a recess, e.g. a middle slot 3041, and a plurality of middle fixing holes (not shown), in such a manner that the middle ring groove 3040 and the middle slot 3041 are arranged between the middle fixing holes while allowing the middle ring groove 3040 to be filled by a sealant 3042. In this embodiment, the sealant 3042 is an elastic sealing part.

In addition, the cross section of the top sealing ring 40 is formed like the letter "L," whereas the top sealing ring 40 is mounted on the middle support 304 while allowing the same to be arranged neighboring to the blade 12. Similarly, the top sealing ring 40 composed of multiple top ring segments such as two top half rings 400 that are capable of interconnecting to each other for forming a full ring, and in the case of half rings the two ends of each top half ring 400 are formed respectively with a top lug 401 to be used for coupling to the corresponding top lug 401 formed on another top half ring 400 so as to form the complete top sealing ring 40. Moreover, each of the two top half rings 400 is configured with half of a top coupler 402 and half of a top neck 403.

Similarly, the top coupler 402 is arranged to couple to the top neck 403, whereas the top coupler 402 has a top shoulder part 4020 formed on an end thereof, for abutting against the middle extension part 303, and thus enabling the top sealing ring 40 to engage exactly with the middle sealing ring 30. As shown in FIG. 2, the top coupler 402 may be further formed with a protrusion, e.g. a top block 4021 at a position corresponding to the middle slot 3041 for allowing the same to inset into the middle slot 3041, so as to fixedly secure the top sealing ring 40 to the middle sealing ring 30, and simultaneously seal the middle slot 3041. In addition, the top coupler 402 is formed with a plurality of top coupling holes at positions corresponding to the plural middle fixing holes, so that each middle coupling hole can be fitted to the bottom fixing hole corresponding thereto by a fixing element 4022 (not shown), so as to lock the top sealing ring 40 and the middle sealing ring 30 together.

In addition, one surface of the top neck 403 that is orientated facing toward the blade 12 is formed with two top ring grooves 4030 while allowing each of the two top ring grooves 4030 to be filled with a sealant 4031 for sealing the gap formed between the blade 12 and the top sealing ring 40. In this embodiment, the sealant 4031 is an elastic sealing part.

Figure 3:
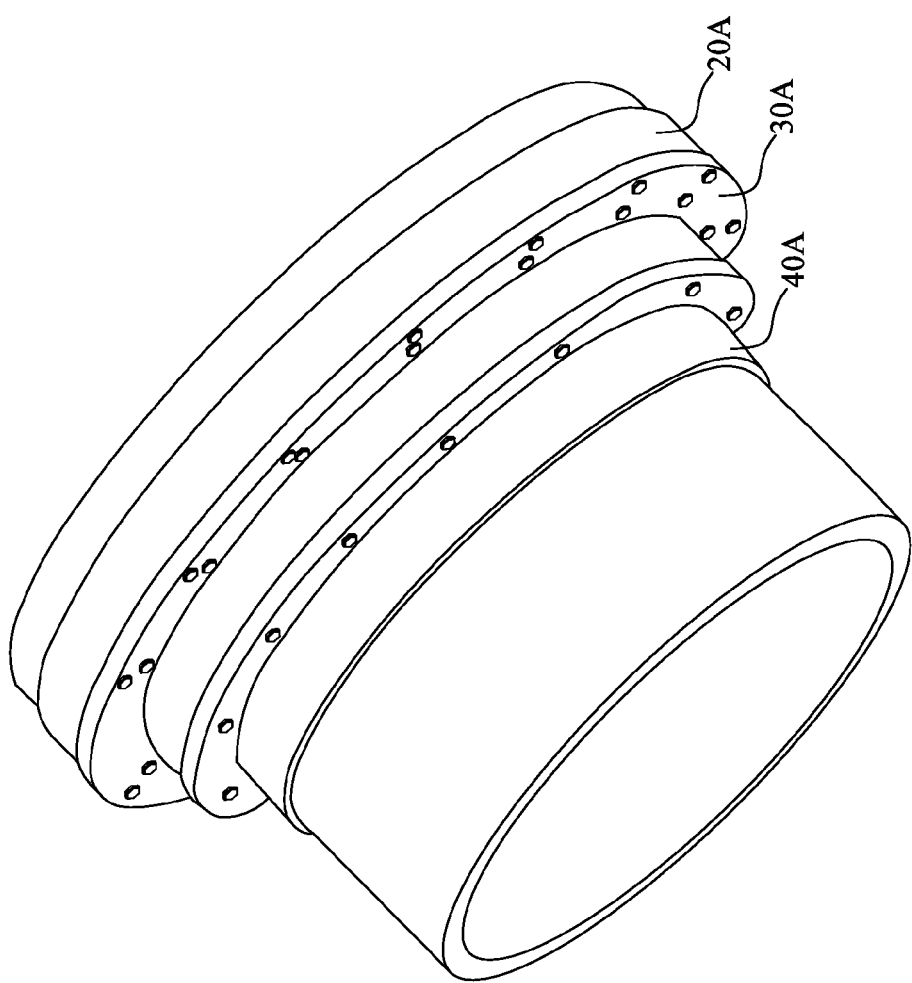
FIG. 3 is a three-dimensional diagram showing a hub sealing apparatus for windmills according to a second embodiment.

FIG. 3 is a three-dimensional diagram showing a hub sealing apparatus for windmills according to a second embodiment. In this embodiment, rather than using sealing rings that are composed of multiple ring segments such as two half rings as disclosed in the first embodiment, the bottom sealing ring 20A, the middle sealing ring 30A and the top sealing ring 40A are all formed respectively as a complete ring. Other than that, all of the other components of the bottom sealing ring 20A, the middle sealing ring 30A and the top sealing ring 40A are exactly the same as in the first embodiment, and thus will not be described further herein.

Figure 4:
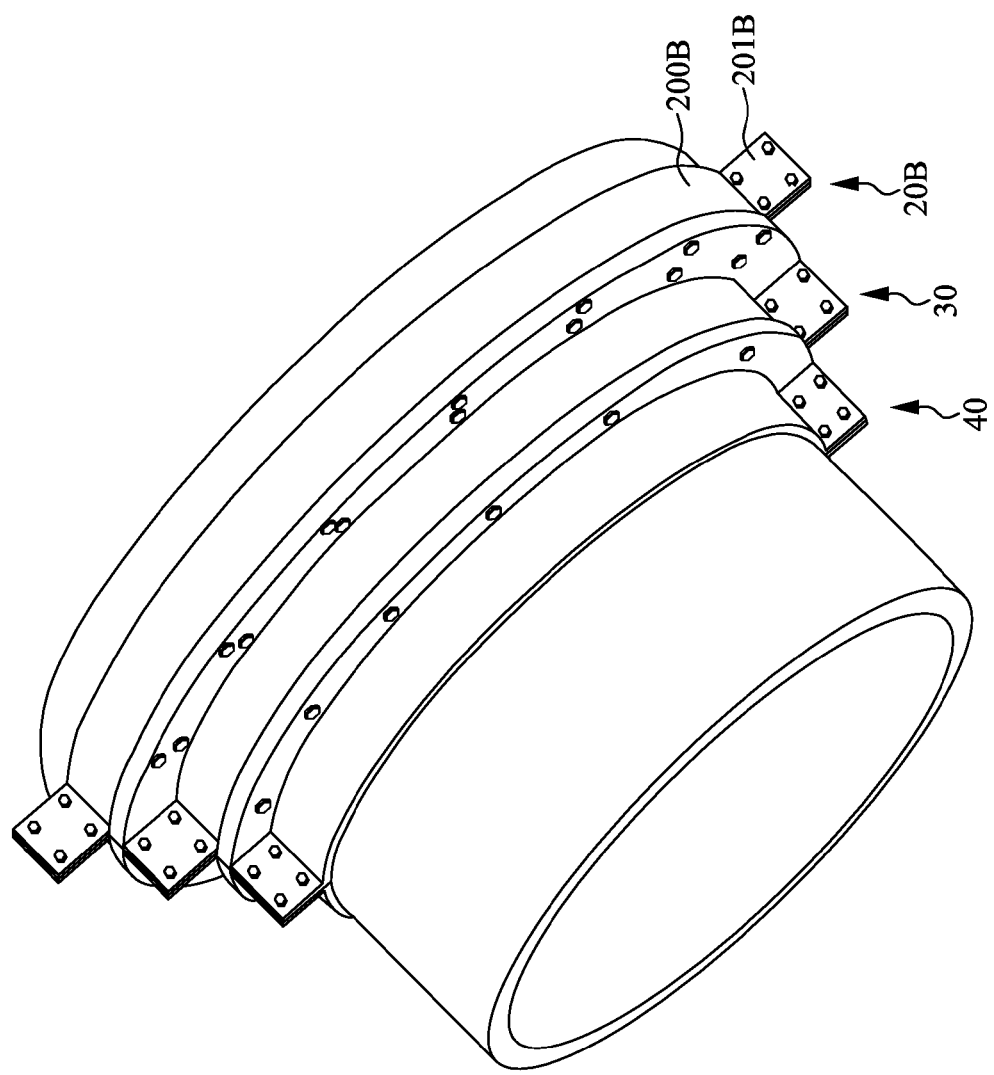
FIG. 4 is a three-dimensional diagram showing a hub sealing apparatus for windmills according to a third embodiment.

Please refer to FIG. 4, which is a three-dimensional diagram showing a hub sealing apparatus for windmills according to a third embodiment. In the third embodiment, the middle sealing ring 30 and the top sealing ring 40 may be exactly the same as those disclosed in the first embodiment, but the bottom sealing ring 20B is also composed of multiple bottom ring segments such as two bottom half rings 200B, where the two ends of each bottom half ring 200B are formed respectively with a bottom lug 201B to be used for coupling to the corresponding bottom lug 201B of another middle half ring, so as to form the complete bottom sealing ring 20B. Other than that, the bottom sealing ring 20B may be structurally the same as those disclosed in the foregoing embodiments and thus will not be described further herein.

Figure 5:
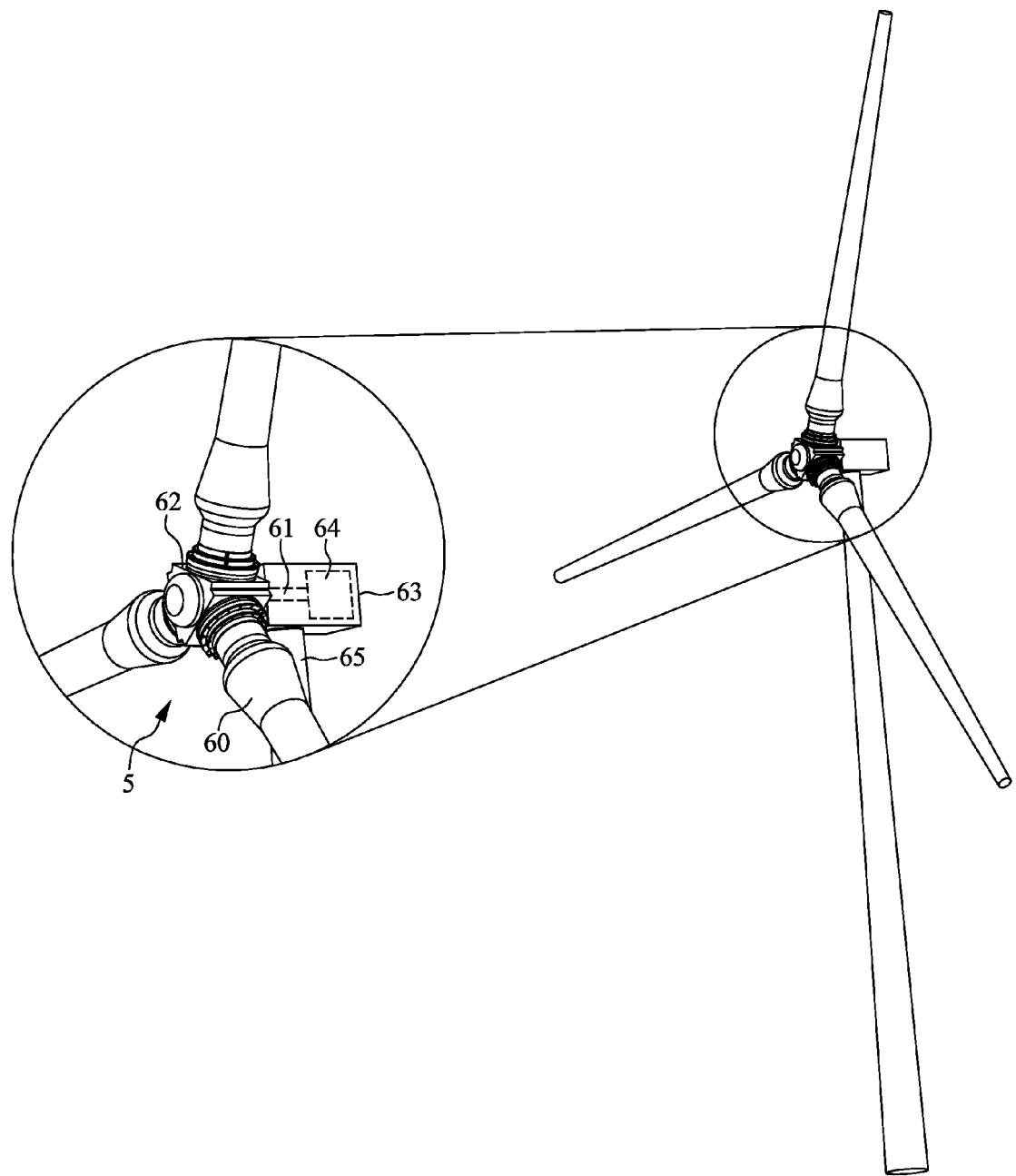
FIG. 5 is a three-dimensional diagram showing a windmill and the partial enlargement of the windmill.

FIG. 5 shows a windmill and a partial enlargement of the windmill. As shown in FIG. 5, the windmill includes at least one blade 60, a shaft 61, a hub 62, a nacelle 63, a generating unit 64, a tower 65 and at least one hub sealing apparatus 5.

The generating unit 64 is installed in the nacelle 63. The nacelle 63 is coupled to the tower 65.

The shaft 61 is installed in the nacelle 63 and coupled to the generating unit 64.

The hub 62 is coupled to the shaft 61. The hub 62 has at least one bearing outer ring and at least one internal gear of a bearing inner ring. The bearing outer ring is coupled to the internal gear of the bearing inner ring. The internal gear of the bearing inner ring is coupled to the blade 60. The bearing outer ring and the internal gear of the bearing inner ring are structurally the same as those disclosed in the foregoing embodiments and thus will not be described further herein.

The hub sealing apparatus 5 is coupled to the blade 60 and the hub 62. The hub sealing apparatus 5 may be structurally the same as those disclosed in the foregoing embodiments and thus will not be described further herein.

When a wind force acts on the blade 60, the hub 62 is rotated by the blade 60. The shaft 61 is driven by the rotating hub 62. The generating unit 64 is driven by the shaft 61, so that the generating unit 64 is able to generate electricity.

As is apparent from the structures and the assembly of the hub sealing apparatus 5 as described above, the hub sealing apparatus 5 can be replaced easily if needed, and can achieve a superior sealing effect.

To sum up, the hub sealing apparatus for windmills disclosed herein is substantially an assembly of multiple sealing rings that can be detached and replaced easily, and is designed with a flexible architecture for allowing the sealing apparatus to be adapted to any type of windmills and thus achieving a good sealing effect.

In addition, by the mating of recesses (e.g. slots) and the corresponding protrusions (e.g. blocks), such as the bottom slot and the bottom block, the middle slot and the middle block, and the top slot and the top block illustrated herein, and also by the filling of the sealants into the ring grooves including the bottom ring groove, the middle ring groove and the top ring groove, the hub sealing apparatus can provide multiple seals to the hub to achieve a better sealing effect and also to prevent leakage or permeation.

With respect to the above descriptions, it is to be realized that the optimum dimensional relationships of parts, to include variations in size, materials, shape, form, function and manner of operation, assembly and use, are deemed readily apparent to those skilled in the art, and all equivalent relationships to those illustrated in the drawings and described in the specification are intended to be encompassed by the present disclosure.

What is claimed is:

1. A hub sealing apparatus for sealing an interval between a hub and a blade of a windmill, comprising:
    a bottom sealing ring configured to be sealed to the hub, the bottom sealing ring including a bottom support having a groove;
    a top sealing ring configured to be rotatably sealed to the blade; and
    a middle sealing ring configured to be sealed to the top sealing ring and the bottom sealing ring, so as to connect the top and bottom sealing rings, the middle sealing ring having a middle coupler configured to be sealed to the bottom support; and
    an elastic sealing part for placement in the groove, thereby to seal an interval between the bottom support and the middle coupler, one of the bottom support and the middle coupler having a recess formed therein, the other of the bottom support and the middle coupler having a protrusion matching the recess, so as to seal an interval between the bottom support and the middle coupler when the protrusion is placed in the recess.

2. The hub sealing apparatus of claim 1, wherein an interval between the top sealing ring and the blade is formed between facing surfaces of the top sealing ring and the blade, further comprising a ring groove formed in the surface of the top sealing ring, and an additional elastic sealing part for placement in the ring groove, thereby to seal the interval between the top sealing ring and the blade.

3. The hub sealing apparatus of claim 1, wherein an interval between the top sealing ring and the blade is formed between facing surfaces of the top sealing ring and the blade, further comprising a plurality of ring grooves formed on the surface of the top sealing ring, and a plurality of additional elastic sealing parts each corresponding to one of the plurality of ring grooves for placement in the corresponding ring groove, thereby to seal the interval between the top sealing ring and the blade.

4. The hub sealing apparatus of claim 1, wherein the middle coupler has a middle shoulder part formed at an end thereof to cover a seam formed between the bottom support and the middle coupler.

5. The hub sealing apparatus of claim 1, wherein the middle sealing ring includes a middle support, and the top sealing ring includes a top coupler configured to be sealed to the middle support.

6. The hub sealing apparatus of claim 5, wherein the middle support has a middle support groove, further comprising an additional elastic sealing part for placement in the middle support groove, thereby to seal an interval between the middle support and the top coupler.

7. The hub sealing apparatus of claim 5, wherein
one of the middle support and the top coupler has an additional recess formed therein, and
the other of the middle support and the top coupler has an additional protrusion matching the additional recess, so as to seal an interval between the middle support and the top coupler when the additional protrusion is placed in the additional recess.

8. The hub sealing apparatus of claim 5, wherein the middle support has a middle support groove, further comprising an additional elastic sealing part for placement in the middle support groove, thereby to seal an interval between the middle support and the top coupler, one of the middle support and the top coupler having an additional recess formed therein, the other of the middle support and the top coupler having an additional protrusion matched therewith, so as to seal an interval between the middle support and the top coupler when the additional protrusion is placed in the additional recess.

9. The hub sealing apparatus of claim 5, wherein the top coupler has a top shoulder part formed at an end thereof to cover a seam formed between the middle support and the top coupler.

10. The hub sealing apparatus of claim 1, wherein at least one of the top, bottom and middle rings includes a plurality of ring segments configured to form a whole ring when assembled in the sealing apparatus.

11. The hub sealing apparatus of claim 10, wherein the plurality of ring segments includes two half rings.

12. The hub sealing apparatus of claim 10, wherein each of the plurality of ring segments has two lugs respectively formed at two ends thereof.

13. The hub sealing apparatus of claim 10, wherein each of the top, bottom and middle rings includes a plurality of ring segments configured to form a whole ring when assembled in the sealing apparatus.

14. The hub sealing apparatus of claim 10, wherein an interval between the top sealing ring and the blade is formed between facing surfaces of the top sealing ring and the blade, further comprising a ring groove formed in the surface of the top sealing ring, and an additional elastic sealing part for placement in the ring groove, thereby to seal the interval between the top sealing ring and the blade.

15. The hub sealing apparatus of claim 10, wherein an interval between the top sealing ring and the blade is formed between facing surfaces of the top sealing ring and the blade, further comprising a plurality of ring grooves formed on the surface of the top sealing ring, and a plurality of additional elastic sealing parts each corresponding to one of the plurality of ring grooves for placement in the corresponding ring groove, thereby to seal the interval between the top sealing ring and the blade.

16. The hub sealing apparatus of claim 10, wherein the bottom support has a groove, further comprising an elastic sealing part for placement in the groove, thereby to seal an interval between the bottom support and the middle coupler.

17. The hub sealing apparatus of claim 10, wherein
one of the bottom support and the middle coupler has a recess formed therein, and
the other of the bottom support and the middle coupler has a protrusion matching the recess, so as to seal an interval between the bottom support and the middle coupler when the protrusion is placed in the recess.

18. The hub sealing apparatus of claim 10, wherein the middle coupler has a middle shoulder part formed at an end thereof to cover a seam formed between the bottom support and the middle coupler.

19. The hub sealing apparatus of claim 10, wherein the middle sealing ring includes a middle support, and the top sealing ring includes a top coupler configured to be sealed to the middle support.

20. The hub sealing apparatus of claim 19, wherein the middle support has a middle support groove, further comprising an additional elastic sealing part for placement in the middle support groove, thereby to seal an interval between the middle support and the top coupler.

21. The hub sealing apparatus of claim 19, wherein
one of the middle support and the top coupler has an additional recess formed therein, and
the other of the middle support and the top coupler has an additional protrusion matching the additional recess, so as to seal an interval between the middle support and the top coupler when the additional protrusion is placed in the additional recess.

22. The hub sealing apparatus of claim 19, wherein the middle support has a middle support groove, further comprising an additional elastic sealing part for placement in the middle support groove, thereby to seal an interval between the middle support and the top coupler, one of the middle support and the top coupler having an additional recess formed therein, the other of the middle support and the top coupler having an additional protrusion matched therewith, so as to seal an interval between the middle support and the top coupler when the additional protrusion is placed in the additional recess.

23. The hub sealing apparatus of claim 19, wherein the top coupler has a top shoulder part formed at an end thereof to cover a seam formed between the middle support and the top coupler.

24. A windmill, comprising:
a hub;
at least one blade; and
a hub sealing apparatus sealing an interval between the hub and the blade, including:
a bottom sealing ring removably sealed to the hub, and including a bottom support having a groove;
a top sealing ring removably rotatably sealed to the blade;
a middle sealing ring removably sealed to the top sealing ring and the bottom sealing ring, so as to connect the top and bottom sealing rings, said middle sealing ring including a middle coupler that is removably sealed to the bottom support; and an elastic sealing part removably disposed in the groove, thereby sealing an interval between the bottom support and the middle coupler, one of the bottom support and the middle coupler having a recess, the other of the bottom support and the middle coupler having a protrusion, the protrusion being removably disposed in the recess to seal an interval between the bottom support and the middle coupler.

25. The windmill of claim 24, wherein an interval between the top sealing ring and the blade is formed between facing surfaces of the top sealing ring and the blade, further comprising a ring groove formed in the surface of the top sealing ring, and an additional elastic sealing part removably disposed in the ring groove, thereby sealing the interval between the top sealing ring and the blade.

26. The windmill of claim 24, wherein an interval between the top sealing ring and the blade is formed between facing surfaces of the top sealing ring and the blade, further comprising a plurality of ring grooves formed on the surface of the top sealing ring, and a plurality of additional elastic sealing parts each corresponding to one of the plurality of ring grooves and being removably disposed in the corresponding ring groove, thereby sealing the interval between the top sealing ring and the blade.

27. The windmill of claim 24, wherein the middle coupler has a middle shoulder part formed at an end thereof to cover a seam formed between the bottom support and the middle coupler.

28. The windmill of claim 24, wherein the middle sealing ring includes a middle support, and the top sealing ring includes a top coupler that is removably sealed to the middle support.

29. The windmill of claim 28, wherein the middle support has a middle support groove, further comprising an additional elastic sealing part removably disposed in the middle support groove, thereby sealing an interval between the middle support and the top coupler.

30. The windmill of claim 28, wherein one of the middle support and the top coupler has an additional recess, and the other of the middle support and the top coupler has an additional protrusion, the additional protrusion being removably disposed in the additional recess to seal an interval between the middle support and the top coupler.

31. The windmill of claim 28, wherein the middle support has a middle support groove, further comprising additional elastic sealing parts removably disposed in the middle support groove, thereby sealing an interval between the middle support and the top coupler, one of the middle support and the top coupler having an additional recess formed therein, the other of the middle support and the top coupler having an additional protrusion, the additional protrusion being removably disposed in the additional recess to seal an interval between the middle support and the top coupler.

32. The windmill of claim 28, wherein the top coupler has a top shoulder part formed at an end thereof to cover a seam formed between the middle support and the top coupler.

33. The windmill of claim 28, wherein at least one of the top, bottom and middle rings includes a plurality of ring segments.

34. The windmill of claim 33, wherein the plurality of ring segments includes two half rings.

35. The windmill of claim 33, wherein each of the plurality of ring segments has two lugs respectively formed at two ends thereof.

36. The windmill of claim 33, wherein each of the top, bottom and middle rings includes a plurality of ring segments.

37. A method of manufacturing a windmill, comprising:
providing a hub and at least one blade;
sealing a bottom sealing ring to the hub;
rotatably sealing a top sealing ring to the blade;
sealing a middle sealing ring to the top sealing ring and the bottom sealing ring, so as to connect the top and bottom sealing rings;
forming a bottom support on the bottom sealing ring;
forming a middle coupler on the middle sealing ring;
sealing the middle coupler to the bottom support;
forming a groove in the bottom support, and disposing an elastic sealing part in the groove, thereby to seal an interval between the bottom support and the middle coupler; and
forming a recess and a protrusion respectively on one of the bottom support and the middle coupler, and disposing the protrusion in the recess to seal an interval between the bottom support and the middle coupler.

38. The method of claim 37, further comprising:
forming an interval between the top sealing ring and the blade between facing surfaces of the top sealing ring and the blade;
forming a ring groove in the surface of the top sealing ring, and
disposing an additional elastic sealing part in the ring groove, thereby to seal the interval between the top sealing ring and the blade.

39. The method of claim 37, further comprising:
forming an interval between the top sealing ring and the blade between facing surfaces of the top sealing ring and the blade;
forming a plurality of ring grooves on the surface of the top sealing ring, and
disposing a plurality of additional elastic sealing parts each corresponding to one of the plurality of ring grooves in the corresponding ring groove, thereby to seal the interval between the top sealing ring and the blade.

40. The method of claim 37, further comprising forming a middle shoulder part at an end of the middle coupler to cover a seam formed between the bottom support and the middle coupler.

41. The method of claim 37, further comprising:
forming a middle support on the middle sealing ring;
forming a top coupler on the top sealing ring; and
sealing the top coupler to the middle support.

42. The method of claim 41, further comprising forming an additional groove in the middle support, and disposing an additional elastic sealing part in the additional groove, thereby to seal an interval between the middle support and the top coupler.

43. The method of claim 41, further comprising forming an additional recess and an additional protrusion respectively on one of the middle support and the top coupler, and disposing the additional protrusion in the additional recess to seal an interval between the middle support and the top coupler.

44. The method of claim 41, further comprising:
forming an additional groove in the middle support, and disposing an additional elastic sealing part in the additional groove, thereby to seal an interval between the middle support and the top coupler; and
forming an additional recess and an additional protrusion respectively on one of the middle support and the top coupler, and disposing the additional protrusion in the additional recess to seal an interval between the middle support and the top coupler.

45. The method of claim 41, further comprising forming a top shoulder part at an end of the top coupler to cover a seam formed between the middle support and the top coupler.

46. The method of claim 41, wherein at least one of the top, bottom and middle rings includes a plurality of ring segments, further comprising assembling the plurality of ring segments to form a whole ring.

47. The method of claim 46, wherein the plurality of ring segments includes two half rings.

48. The method of claim 46, wherein each of the plurality of ring segments has two lugs respectively formed at two ends thereof.

49. The method of claim 46, wherein each of the top, bottom and middle rings includes a plurality of ring segments.

* * * * *